Patented Sept. 11, 1928.

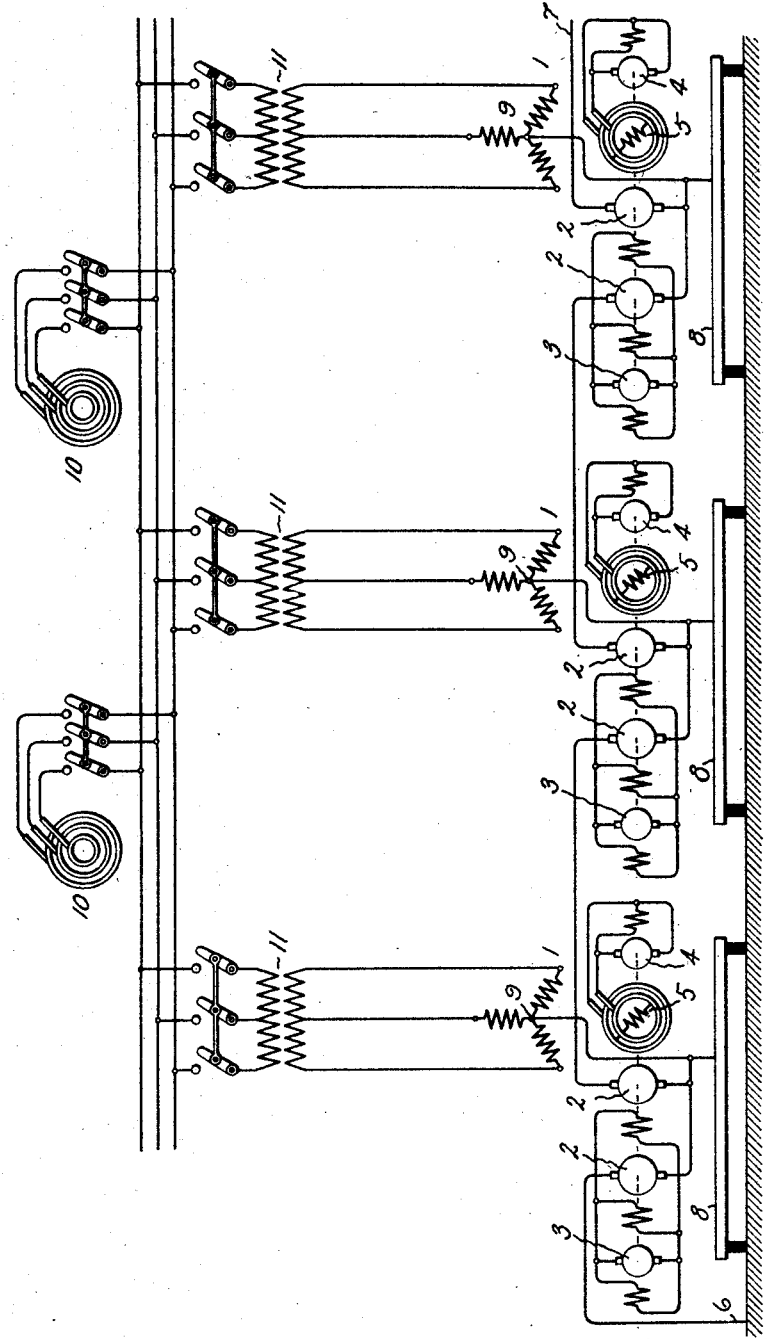

1,684,253

UNITED STATES PATENT OFFICE.

FRANK P. WHITAKER, OF RUGBY, ENGLAND, ASSIGNOR TO GENERAL ELECTRIC COMPANY, A CORPORATION OF NEW YORK.

DYNAMO-ELECTRIC MACHINE.

Application filed July 27, 1925, Serial No. 46,281, and in Great Britain July 31, 1924.

This invention relates to dynamo electric machines and more particularly to machines for generating direct current at very high voltage.

It is well known that to obtain very high direct current voltages it is necessary to install machines in series as the voltage which can be generated by each machine is limited. When very large outputs at very high voltages are required the design of insulated couplings between machines in series to withstand normal loads and overloads incidental to short-circuits becomes difficult and expensive.

The object of this invention is to provide an arrangement for operating direct current generators in series in order to obtain very high direct current voltages without the necessity of employing insulated couplings.

The invention consists in providing a number of motor generator sets suitable for voltages that are considered safe as far as generation is concerned, insulating each set to withstand this voltage to its own frame and base plate, which are insulated from earth, and connecting the sets in series, the number of sets being made suitable for the required high tension direct current voltage.

For a better understanding of my invention, reference may be had to the following description taken in connection with the accompanying drawing, in which the single figure diagrammatically illustrates one embodiment of my invention.

Referring to the drawing, there is shown a plurality of motor generator sets, each comprising a motor 1, generators 2 and exciters 3 and 4. The field 5 of the motor 1, the armatures of the generators 2, as well as the armatures of the exciters 3 and 4 are all direct connected together. The armatures of the generators 2 of all the sets are connected in series so that the voltage between ground, to which main 6 is connected, and the main 7 is the sum of the voltages of all the generators 2. Each of the motor generator sets is mounted on a base plate 8 which is insulated from the ground. The neutral point 9 of the stator winding of the motor 1 and the connection between the armatures 2 of each motor generator set is electrically connected to the base plate 8 on which the particular motor generator set is mounted. The alternating current motors 1 are supplied from alternators 10 through transformers 11 which are provided with high tension insulation on their secondary winding. Each of the exciters 4 supplies the rotor 5 of the motor 1, to which it is direct connected, with direct current excitation. Each of the exciters 3 supplies the excitation to the fields of the generators 2 of the motor generator set of which it forms a part.

The base plate on the end machine will have to be insulated to withstand practically the full direct current voltage pressure to ground, that is, the voltage between mains 6 and 7. It will also be necessary to insulate the winding of each set for the voltage between each set and its own base plate. The motor driving the generator or generators in each set can be constructed for any suitable voltage and the neutral or other suitable point of the winding is connected to the base plate so as to limit the voltage at any part of the winding to base plate to a value which is not greater than the voltage for which the motor is constructed. The armature winding on each direct current generator is also connected to its own base plate to insure that the voltage between the winding and the base plate is limited to a value not greater than that which the direct current armature is generating.

The secondary winding of each transformer, while being constructed for the voltage between phases that is suitable for driving the alternating current motor of the set, will be insulated from the primary winding to safely withstand the high tension direct current voltage.

By this arrangement it is possible to produce very high tension direct current by a series connection of direct current generators driven through ordinary couplings by alternating current motors, these motors being constructed for any suitable low voltage between phases and supplied through transformers which are insulated between the primary and secondary to withstand the very high tension direct current.

What I claim as new and desire to secure by Letters Patent of the United States, is—

1. In a high voltage direct current system, a plurality of motor generator sets, each motor generator set comprising a motor and a generator, the generators of said sets being connected in series, base plates on which said motor generator sets are mounted, means for insulating said base plates from ground, and means for electrically connecting the stator winding of the motor and the armature winding of the generator of each motor generator set to the base plate on which it is mounted.

2. In a high voltage direct current system, a plurality of motor generator sets, each motor generator set comprising a motor and a plurality of generators, said generators of said sets being connected in series, base plates on which said motor generator sets are mounted, means for insulating said base plates from ground, and means for electrically connecting a point between the generators of each motor generator set to the base plate on which said set is mounted.

3. In a high voltage direct current system, a plurality of motor generator sets, each motor generator set comprising a motor and a plurality of generators, said generators of said sets being connected in series, base plates on which said motor generator sets are mounted, means for insulating said base plates from ground, and means for electrically connecting a point between the generators of each motor generator set and the stator winding of the motor of each motor generator set to the base plate on which said set is mounted.

4. In a high voltage direct current system, a plurality of motor generator sets, each motor generator set comprising a motor and a plurality of generators, said generators of said sets being connected in series, base plates on which said motor generator sets are mounted, means for insulating said base plates from ground, and means for electrically connecting a point between the generators of each motor generator set and the neutral point of the stator winding of the motor of each motor generator set to the base plate on which said set is mounted.

In witness whereof, I have hereunto set my hand this fourteenth day of July, 1925.

F. P. WHITAKER.